United States Patent
Ueda (10) Patent No.: US 7,626,840 B2
(45) Date of Patent: Dec. 1, 2009

(54) PARALLEL MULTIPLEX MATRIX CONVERTER

(75) Inventor: Yozo Ueda, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 287 days.

(21) Appl. No.: 11/663,853

(22) PCT Filed: Sep. 27, 2005

(86) PCT No.: PCT/JP2005/017711

§ 371 (c)(1),
(2), (4) Date: Mar. 27, 2007

(87) PCT Pub. No.: WO2006/035752

PCT Pub. Date: Apr. 6, 2006

(65) Prior Publication Data

US 2008/0315819 A1      Dec. 25, 2008

(30) Foreign Application Priority Data

Sep. 29, 2004    (JP)  ............................. 2004-283362

(51) Int. Cl.
*H02M 5/275*    (2006.01)
(52) U.S. Cl. .................................. 363/163; 363/165

(58) Field of Classification Search .................. 363/163, 363/157, 159, 165
See application file for complete search history.

(56) References Cited

U.S. PATENT DOCUMENTS 5,909,367 A  *  6/1999  Change .................. 363/163

FOREIGN PATENT DOCUMENTS

| JP | 63-36190  U  | 3/1988 |
| JP | 64-047268 A  | 2/1989 |
| JP | 2003-259647 A | 9/2003 |

* cited by examiner

*Primary Examiner*—Shawn Riley
(74) *Attorney, Agent, or Firm*—Sughrue Mion, PLLC (57) ABSTRACT

The parallel multiplex matrix converter couples in parallel at least two matrix converters, each of which PWM-controls bidirectional switches coupling input phases from an AC power supply to each output phases so as to output an arbitrary AC voltage or DC voltage. The output sides of the matrix converters are directly coupled in parallel to each other without any reactor. The input sides of the matrix converters use reactors inserted between the input phases from the AC power supply and the AC power supply at each of the respective matrix converters coupled in parallel.

4 Claims, 6 Drawing Sheets

PARALLEL MULTIPLEX MATRIX CONVERTER

TECHNICAL FIELD

The present invention relates to an apparatus which configures matrix converters outputting an arbitrary multi-phase AC voltage or a DC voltage from a multi-phase AC power supply in a parallel multiplex coupling structure so as to increase the capacity of the apparatus.

BACKGROUND ART

Figure 7:
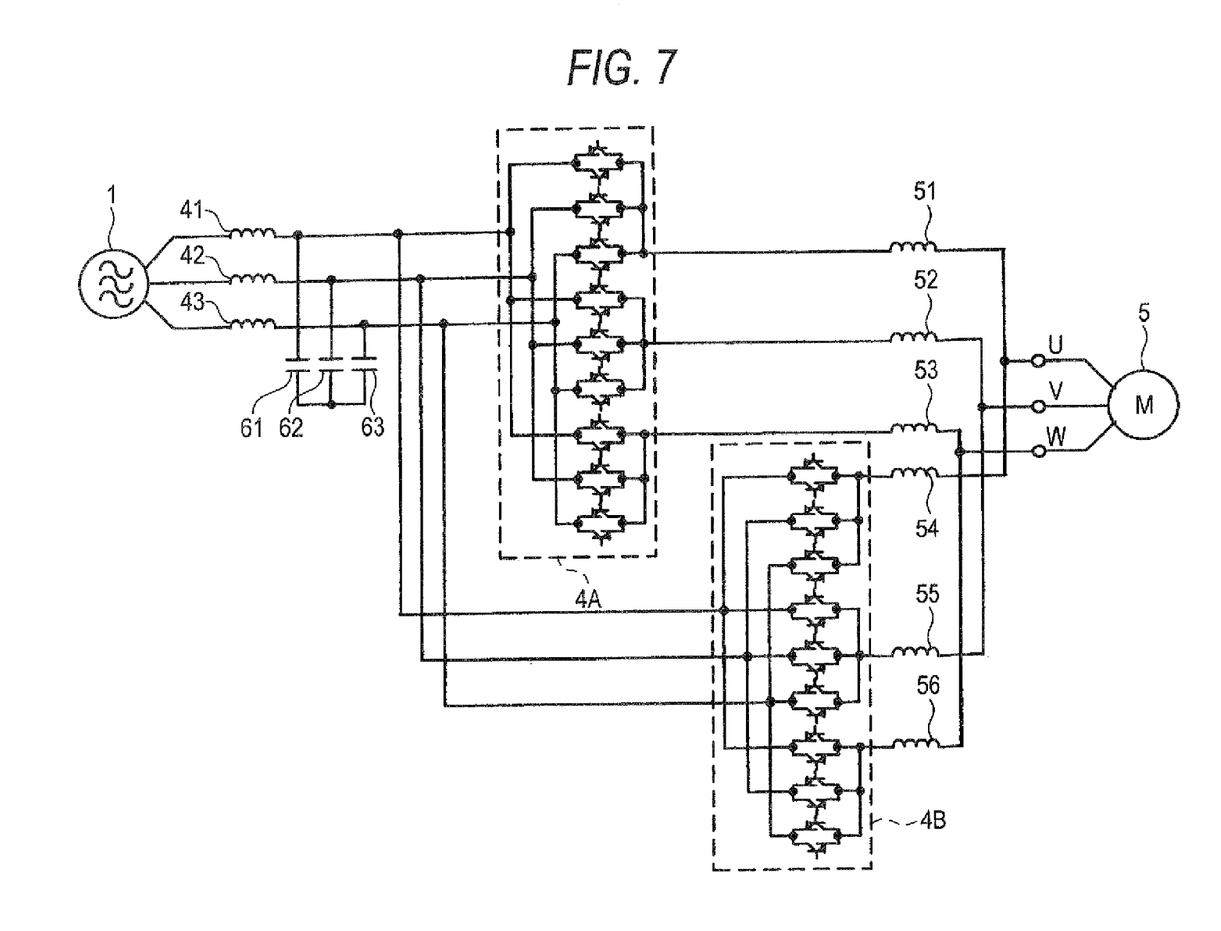
FIG. 7 is a parallel multiplex matrix converter according to the related art.

In order to realize the increase of the capacity of a matrix converter apparatus, there is a means of employing the parallel multiplex configuration in which a plurality of matrix converters are prepared and the output sides of these converters are coupled in parallel. However, when the output sides are directly coupled in parallel, since the output sides of the respective converters thus coupled in parallel are not always at the same voltage, there may arise a short-circuit between the outputs of the matrix converters. Further, as to the currents flowing through the respective converters thus coupled in parallel, there arises a problem that the current balance states can not be kept same among the respective converters. Consequently, according to the parallel multiplex configuration of the matrix converter apparatus of the related art, as shown in FIG. 7, reactors 51 to 56 are inserted at the respective output phases of the matrix converters thus coupled in parallel, whereby the short-circuit between the outputs of the respective matrix converters is prevented from occurring due to the voltage drop generated at each of the reactors thereby to secure the equalization of the current balance states (see patent document 1, for example).

Incidentally, in order to prevent that the power supply currents flowing through the respective phases of an AC power supply become intermittent due to the on-off PWM control of bidirectional switches in the matrix converter apparatus, in general filter input-reactors 41 to 43 and filter capacitors 61 to 63 are coupled to the respective input phases from the power supply on the input side, whereby the waveforms of the AC power source currents can be made continuous and smooth.

Patent Document 1: JP-A-2003-259647 (FIG. 1)

DISCLOSURE OF THE INVENTION

Problems that the Invention is to Solve

The parallel multiplex matrix converter of the related art shown in FIG. 9 requires reactors on each of the input and output sides and so there arises a problem that the entire configuration of the apparatus including the reactors becomes large. Further, since there are the reactors on the output side, there arises a problem that a serge voltage becomes large at the time of turning the bidirectional switches off.

The present invention is made in view of the aforesaid problems and an object of the present invention is to provide a parallel multiplex matrix converter which can suppress the enlargement of the entire size thereof and reduce a serge voltage at the time of turning bidirectional switches off.

Means for Solving the Problems

In order, to solve the aforesaid problems, according to the invention claimed in claim 1, a parallel multiplex matrix converter is configured by coupling in parallel at least two matrix converters each of which PWM-controls bidirectional switches coupling input phases from an AC power supply serving as an input power supply to each output phases respectively so as to output an arbitrary AC voltage or DC voltage from the each output phases.

The parallel multiplex matrix converter is characterized in that the output phases of the matrix converters are directly coupled in parallel to each other without any reactor, and first reactors are provided so as to be inserted respectively between the AC power supply and the input phases from the AC power supply at each of the respective matrix converters coupled in parallel.

According to the matrix converter apparatus, focusing on that the output current flows at each of the output side and the input side of each of the bidirectional switches, the reactors coupled on the output sides in the related art are moved to the positions on the input sides and where the output currents flow. Thus, the input reactors can be commonly used as the output reactors and the entire size of the apparatus can be miniaturized while securing the prevention of the short-circuit between the matrix converters and the equalization of the current balance states.

Further, there is provided with a route for flowing a current through first reactors, filter capacitors and the AC power supply by using the first reactors commonly used as filter input reactors and the filter capacitors. Thus, even when the bidirectional switch is turned off, the continuity of the currents flowing through the first reactors can be secured and a serge voltage caused from the first reactor at the time of the turning-off of the bidirectional switch can also be suppressed.

In the case where the on/off switching order of the bidirectional switches is erroneous or at the time of the emergency turning-off, a large serge voltage is likely generated since a current route disappears die to the turning-off in the both directions. However, according to the invention, the serge voltage can be suppressed even in such a case.

According to the invention claimed in claim 2, a parallel multiplex matrix converter is configured by coupling in parallel at least two matrix converters each of which PWM-controls bidirectional switches coupling input phases from an AC power supply serving as an input power supply to each output phases respectively so as to output an arbitrary AC voltage or DC voltage from the each output phases.

The parallel multiplex matrix converter characterized in that the output phases of the matrix converters are directly coupled in parallel to each other without any reactor, and each of the respective matrix converters coupled in parallel comprises first reactors inserted respectively between the input phases from the AC power supply and the bidirectional switches respectively coupling the input phases and the output phases.

Although the first reactors are provided in each of the matrix converters, the action and effects similar to the aforesaid invention can be obtained.

According to the invention claimed in claim 3, a parallel multiplex matrix converter is characterized in that second reactors are provided at common coupling points between the AC power supply and the first reactors so as to be inserted between the AC power supply and the common coupling points.

Input reactors, in other words, the second reactors are provided in common to the respective matrix converters, and further the first reactors are provided for each of the respective matrix converters, whereby the equalization of the current balance and so on can be secured.

Since the first reactors are not commonly used as the filter input reactors, it is possible to secure the degree of freedom as to the both the first and second reactors at the time of selecting constants such as the inductance values.

According to the invention claimed in claim 4, A parallel multiplex matrix converter is characterized in that second reactors are provided at common coupling points between the AC power supply and the input phases at the respective matrix converters so as to be inserted between the AC power supply and the common coupling points.

The configuration similar to that of the invention claimed in claim 3 is employed as to the invention claimed in claim 2. In this case, it is also possible to secure the degree of freedom as to the both the first and second reactors at the time of selecting constants.

ADVANTAGE OF THE INVENTION

According to the invention, in the parallel multiplex matrix converter, the output phases of the respective matrix converters are directly coupled in parallel without passing through any output reactor, and the first reactors are inserted between the input portions from the AC power supply of the respective matrix converters and the AC power supply so as to be commonly used as the filter input reactors. Thus, despite of the parallel multiplexing, the output reactors can be eliminated and the miniaturization of the entire size of the apparatus can be realized advantageously.

Further, since it is possible to secure a current route at the time of the turning-off of the bidirectional switch in relation to the filter capacitors coupled on the input side, the serge voltage caused at the time of the turning-off of the bidirectional switch can be suppressed advantageously.

DESCRIPTION OF THE REFERENCE NUMERALS AND SIGNS 1 three-phase AC power supply
4A, 4B matrix converter
5 three-phase AC motor
6 bidirectional switch within matrix converter 4A
7 bidirectional switch within matrix converter 4B
11-16 diode
17-19 IGBT
21, 23 single-phase AC power supply
22A, 22B, 32 reactor
23A, 23B, 33A, 33B IGBT equivalent power supply
41, 42, 43 filter input reactor
47, 48, 49 second reactor
51-56 output side reactor
61, 62, 63 filter capacitor
71-76 first reactor
81-86 filter capacitor

BEST MODE FOR CARRYING OUT THE INVENTION

The respective embodiments of the invention will be explained with reference to drawings.

FIRST EXAMPLE 1

Figure 1:
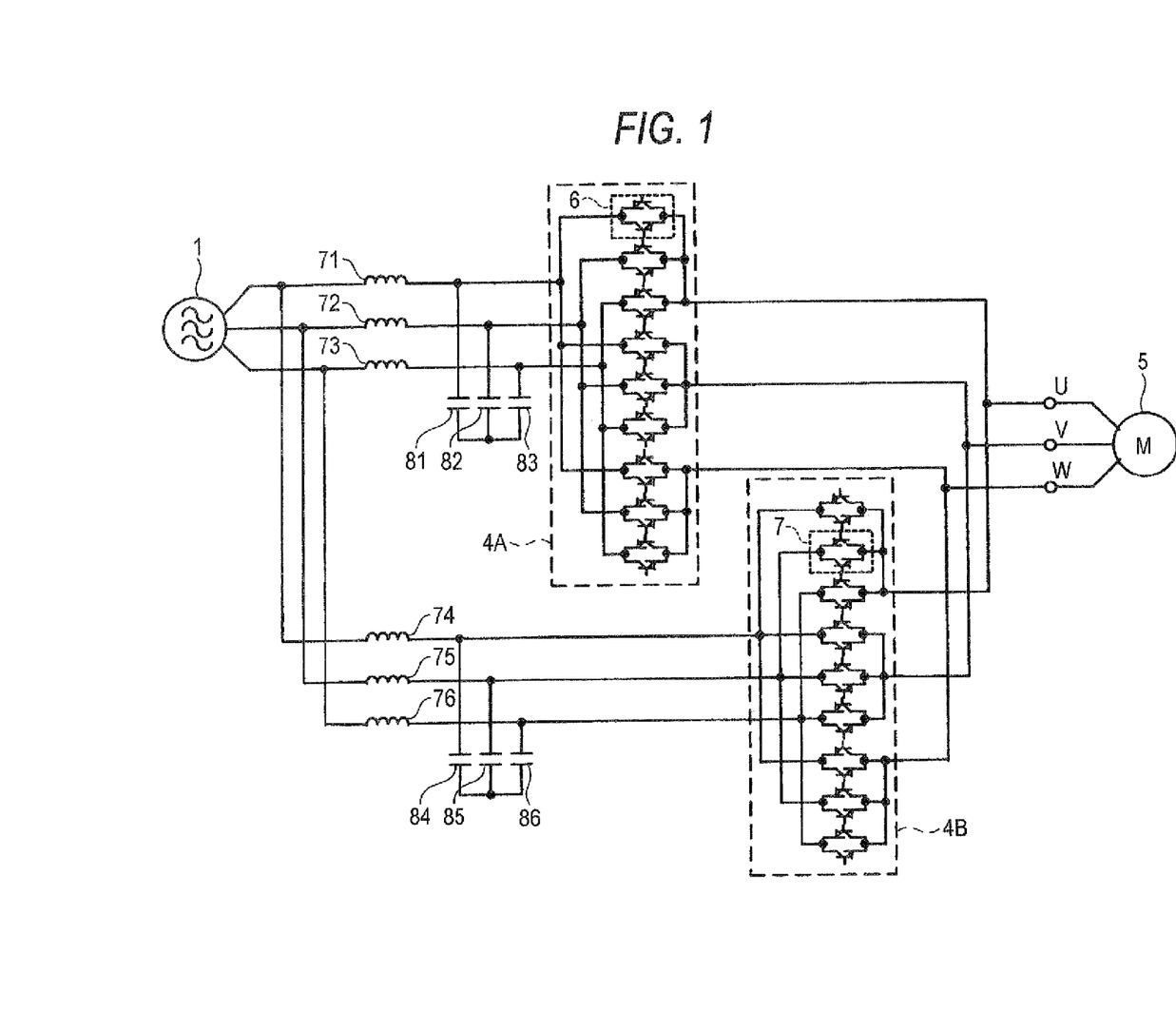
FIG. 1 is a parallel multiplex matrix converter according to the first embodiment of the invention.

FIG. 1 shows a parallel multiplex matrix converter according to the first embodiment of the present invention which is configured by coupling in parallel two matrix converters each of which inputs a three-phase AC power and outputs a three-phase AC output.

In FIG. 1, 1 depicts a three-phase AC power supply. First reactors 71 to 73 and first reactors 74 to 76 also used as filter input reactors are coupled between the AC power supply and the AC power supply input portions of one matrix converter and the other matrix converter, respectively. 81 to 83 and 84 to 86 each depicting a filter capacitor are coupled to the first reactors 71 to 73 and the first reactors 74 to 76, respectively. These filter input reactors and the filter capacitors constitute input filters for the matrix converters, respectively. 4A and 4B depict the matrix converters each of which inputs a three-phase AC power and outputs a three-phase AC output. The matrix converters 4A and 4B are arranged in a manner that the corresponding output phases of these converters are coupled directly in parallel, and the respective phases of the three-phase outputs of the converters thus configured are coupled to a three-phase motor 5 thereby to drive the motor.

Figure 2:
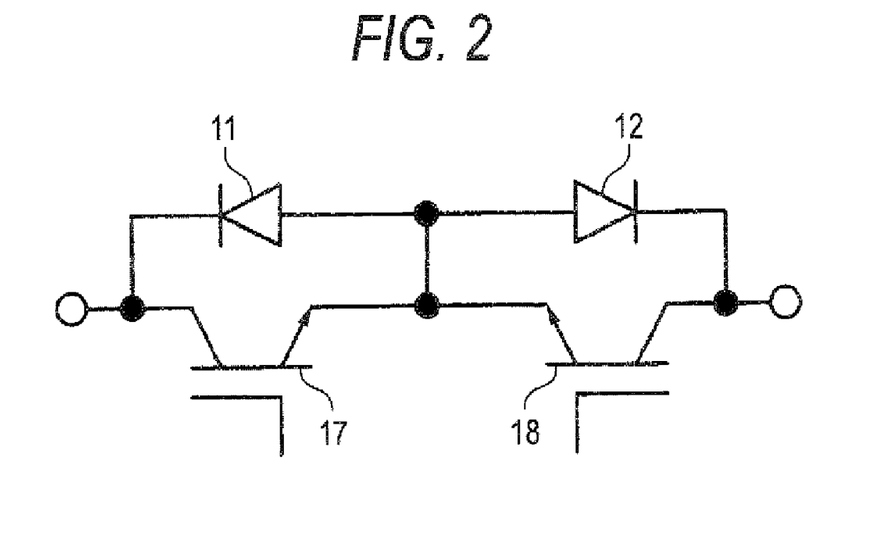
FIG. 2 is an example 2 of the bidirectional switch of the matrix converter.
Figure 3:
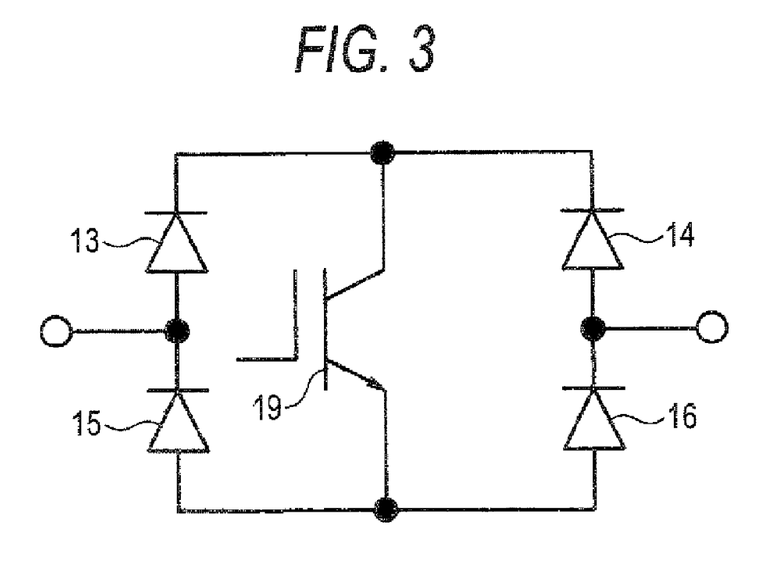
FIG. 3 is an example 3 of the bidirectional switch of the matrix converter.

A bidirectional switch used in the matrix converter may be a reverse-parallel coupling configuration of two IGBTs shown in FIG. 1 or may be a coupling structure of one or two IGBTs and diodes shown in FIGS. 2 and 3. In each case, a self-extinction type semiconductor switching element such as an IGBT is acted as the bidirectional switch by being subjected to the on-off PWM control, whereby the AC power supply voltage is outputted as the PWM output from the output phases thereby to output an arbitrary voltage. In this manner, since the bidirectional switch is configured by a semiconductor switching element such as an IGBT, when the output phases of the bidirectional switches are directly coupled in parallel, there may arise a large difference in the currents flowing through the respective IGBTs due to the characteristic differences of the saturation voltages etc. of the IGBTs corresponding to the respective output phases, that is, the IGBT on the matrix converter 4A side and the IGBT on the matrix converter 4B side. Thus, the reactors 71 to 73 and 74 to 76 are inserted on the input sides of these both matrix converters, respectively, thereby to cause the voltage drops at these reactors sufficient for eliminating the problem of the characteristic differences of the IGBTs.

Further, even in the case where the output voltage values of the matrix converters 4A, 4B differ, the voltage difference can be absorbed as the voltage drops of the reactors and so the short-circuit current on the output side can be prevented from being generated. For example, when the output voltage values of the U-phase of the matrix converter 4A (the bidirectional switch 6 is in an ON state) and the matrix converter 4B (the bidirectional switch 7 is in an ON state) differ, the voltage difference can be absorbed immediately as the voltage drops of the reactors 71 and 75, respectively.

Further, for example, in the case where the output current flows from the reactor 71 to the reactor 75 via the bidirectional switch 6, the motor 5 and the bidirectional switch 7, even if the bidirectional switch 6 or 7 is turned off, the generation of a serge voltage due to the discharge of the electromagnetic energy having been accumulated in the reactor can be prevented since there is a route of flowing the output current from the reactor 71 to the reactors 72, 73 via the capacitors 81, 82 and 83 and a route of flowing the output current from the reactors 74, 76 to the reactor 85 via the capacitors 84, 86 and the capacitor 85.

The parallel multiplex coupling of the related art is arranged in a manner that the matrix converters are mutually coupled in parallel via the reactors inserted on the output side. In contrast, in the invention, it is notified that the input side reactors can be used as the output side reactors in view of the characteristics of the matrix converter apparatus in which the AC power supply voltage is directly outputted as the voltage via the bidirectional switches, whereby the input side reactors are also used as the output side reactors as they are.

Accordingly, since the output side reactors can be eliminated and the input side reactors can also be used as the filter input reactors, the miniaturization of the entire size of the apparatus can be realized.

Figure 4:
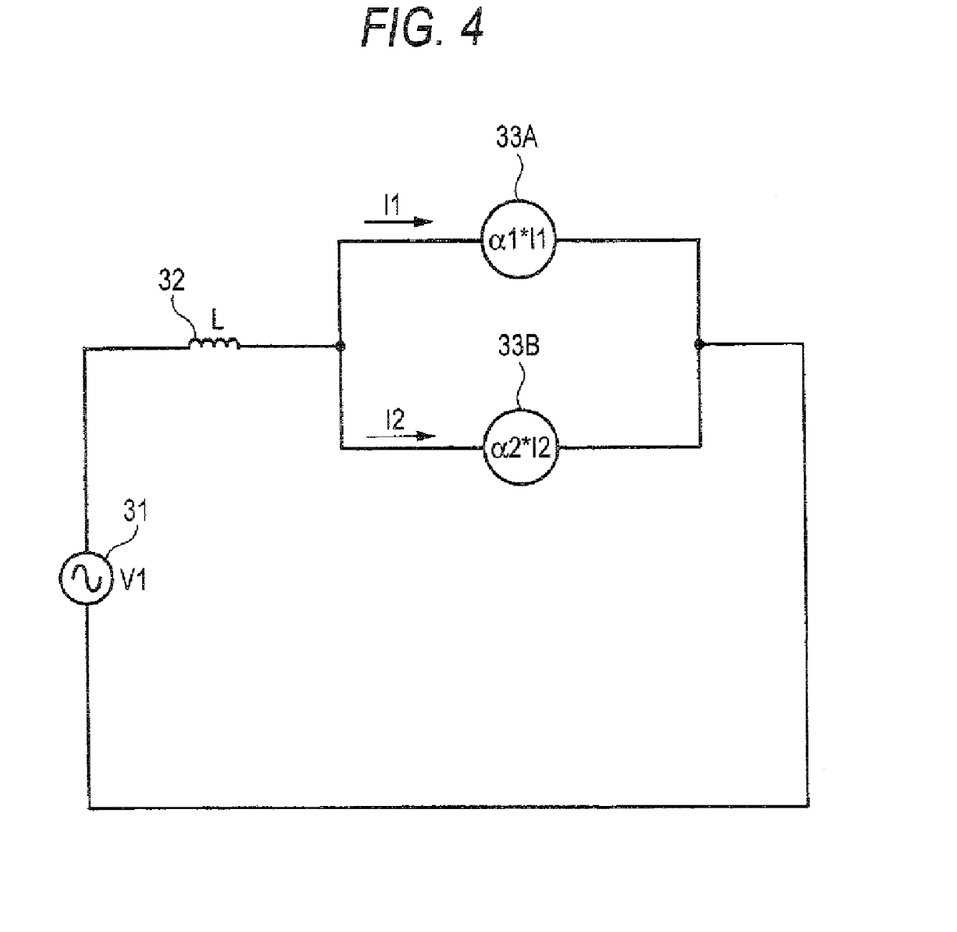
FIG. 4 is a simplified equivalent circuit of the parallel multiplex matrix converter according to the related art.

Next, the explanation will be made as to the effectiveness with respect to the current balancing of the first respective reactors disposed on the input side. FIG. 4 is a simplified equivalent circuit of the parallel multiplex matrix converter according to the related art. In general, the semiconductor switching element such as the IGBT is also considered to be a power supply which generates a voltage increasing in accordance with the magnitude of the input current. Thus, FIG. 4 represents the respective IGBTs as the power supplies 33A, 33B each of which generates the voltage in proportional to the current. When the characteristics of these two IGBTs differ, since proportional coefficients of the generated voltages with respect to the currents thereof also differ, these proportional coefficients are represented by $\alpha 1$, $\alpha 2$, respectively. In this case, since the two IGBT equivalent power supplies 33A, 33B are coupled in parallel, the following expression (1) is obtained.

$$\alpha 1 \cdot I1 = \alpha 2 \cdot I2,$$

That is, $$I1:I2 = \alpha 2:\alpha 1. \tag{1}$$

Thus, since the IGBTs thus coupled in parallel flow the currents therethrough with a ratio according to the proportional coefficients $\alpha 1$, $\alpha 2$, respectively, it is necessary to take such a measure of providing the reactors on the output side in order to improve the current balance state.

Figure 5:
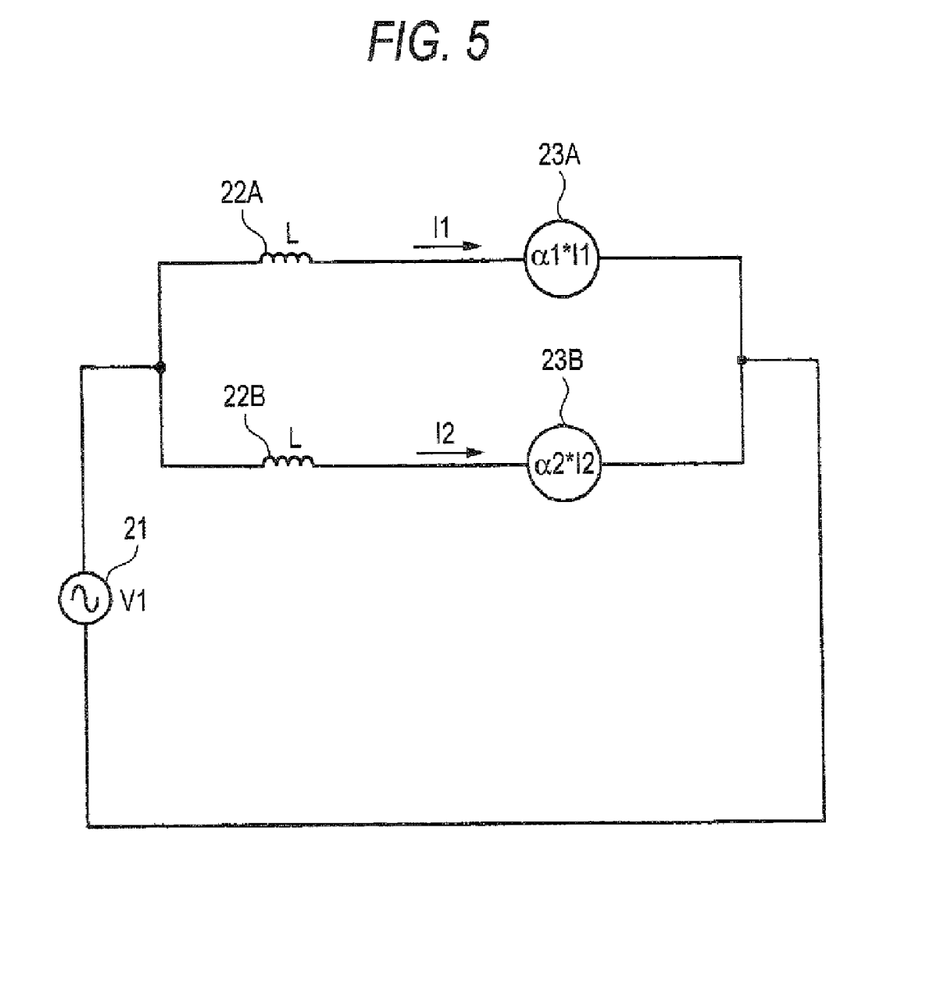
FIG. 5 is a simplified equivalent circuit of the parallel multiplex matrix converter according to the invention.

In contrast, FIG. 5 shows a simplified equivalent circuit of the parallel multiplex matrix converter according to the invention. In this circuit, reactors 22A, 22B are coupled in series with IGBTs 23A, 23B, respectively, and the two series circuits each configured by the IGBT and the reactor are coupled in parallel. Since the reactor causes the voltage drop in proportional to the current flowing therethrough, the following expression is obtained supposing that the angular frequency of the AC power supply 21 is $\omega$.

$$(\alpha 1 + \omega L) \cdot I1 = (\alpha 2 + \omega L) \cdot I2$$

That is, $$I1:I2 = (\alpha 2 + \omega L):(\alpha 1 + \omega L) \tag{2}$$

From the expression (2), it will be understood that the unbalance ratio of the currents flowing through the two IGBTs is smaller than the unbalance ratio of the currents determined by the characteristics of the IGBTs and so the current balance state can be improved as compared with the case of the expression (1). Further, the unbalance ratio can also be adjusted by an inductance values L of the reactors.

Thus, the current balance function of the output filter can also be realized by providing the reactors on the input side.

In this embodiment, although the reactors 71 to 73 and 74 to 76 are provided at the outsides of the matrix converters 4A, 4B, respectively, the similar effects can be obtained as a matter of course in the case where the reactors 71 to 73 are housed within the matrix converter 4A and the reactors 74 to 76 are housed within the matrix converter 4B.

Further, although the embodiment of FIG. 1 shows an example of the construction of the parallel multiplex matrix converter which is configured by the two matrix converters, the invention is not limited to the two matrix converters and the invention can be used in the similar manner as a matter of course in the case where three or more matrix converters are coupled in parallel.

Furthermore, although the filter capacitors 81 to 83 and 84 to 86 in this embodiment are coupled to the respective phases of the AC power supply and mutually coupled in a Y-connection fashion, these filter capacitors may be mutually coupled in a Δ-connection fashion.

SECOND EXAMPLE 2

Figure 6:
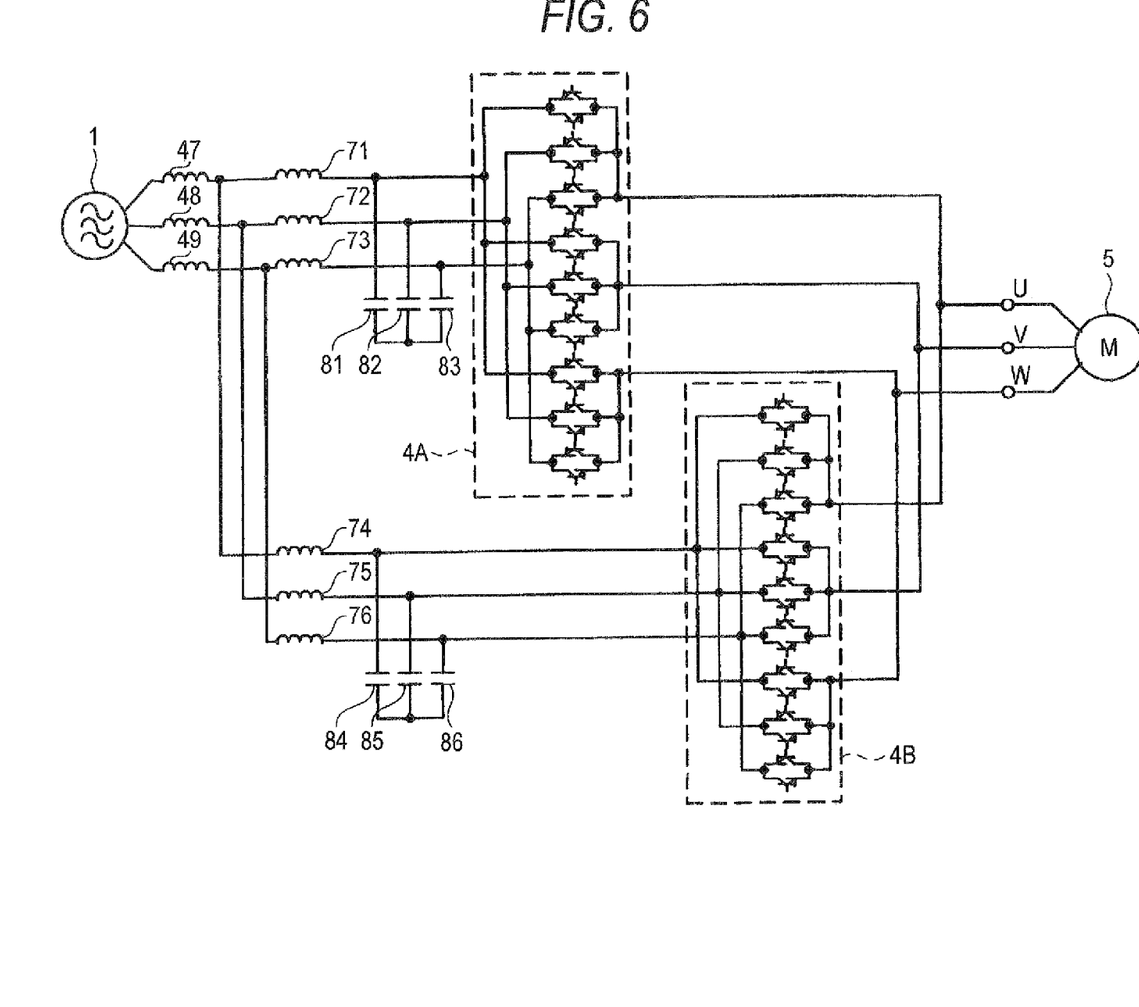
FIG. 6 is a parallel multiplex matrix converter according to the second embodiment of the invention.

FIG. 6 shows the second embodiment of the invention. In FIG. 6, this embodiment is same as the first embodiment except for a point that second reactors 47, 48, 49 are additionally inserted as filter input reactors common to the two matrix converters coupled in parallel.

This embodiment is characterized in that the second reactors serving as the common filter input reactors are provided separately from the current-balancing first reactors, whereby the inductance values of the filter input reactors and the values of the current-balancing reactors can be set freely.

Further, in this embodiment, although the current-balancing reactors are disposed at the outside of the respective matrix converters, the similar effects can be obtained as a matter of course in the case where the respective reactors are housed within the respective matrix converters.

Although each of the first and second embodiments shows an example of the configuration in which the matrix converters each having the three-phase outputs are coupled in parallel, the invention is not limited thereto. That is, the similar configuration can be obtained even if the matrix converters each having one or two output phases are coupled in parallel and the invention intends as a matter of course to contain such a case.

INDUSTRIAL APPLICABILITY

The invention relates to the matrix converter apparatus also capable of the power regeneration, and relates to the technical field in which a plurality of these matrix converters each having a small capacity are configured as the parallel multiplex matrix converter and used as a large-output apparatus capable of the power regeneration. Further, since the output sides of the respective matrix converters are directly coupled in parallel to each other and the reactors are inserted in the input sides of each of the matrix converters, the cost reduction and the miniaturization of the entire apparatus can be realized, and so the layout design of an electric apparatus using the entirety of the apparatus according to the invention can be facilitated. As a usage utilizing the feature of the parallel multiplex matrix converter having a large capacity and capable of regeneration, the invention can be applied to a usage such as an elevator or a crane.

The invention claimed is:

1. A parallel multiplex matrix converter which is configured by coupling in parallel at least two matrix converters each of which PWM-controls bidirectional switches coupling input phases from an AC power supply serving as an input power supply to each output phases respectively so as to output an arbitrary AC voltage or DC voltage from the each output phases, the parallel multiplex matrix converter characterized in that the output phases of the matrix converters are directly coupled in parallel to each other without any reactor, and first reactors are provided so as to be inserted respectively between the AC power supply and the input phases from the AC power supply at each of the respective matrix converters coupled in parallel.

2. A parallel multiplex matrix converter which is configured by coupling in parallel at least two matrix converters each of which PWM-controls bidirectional switches coupling input phases from an AC power supply serving as an input power supply to each output phases respectively so as to output an arbitrary AC voltage or DC voltage from the each output phases, the parallel multiplex matrix converter characterized in that the output phases of the matrix converters are directly coupled in parallel to each other without any reactor, and each of the respective matrix converters coupled in parallel comprises first reactors inserted respectively between the input phases from the AC power supply and the bidirectional switches respectively coupling the input phases and the output phases.

3. A parallel multiplex matrix converter according to claim 1, characterized in that second reactors are provided at common coupling points between the AC power supply and the first reactors so as to be inserted between the AC power supply and the common coupling points.

4. A parallel multiplex matrix converter according to claim 2, characterized in that second reactors are provided at common coupling points between the AC power supply and the input phases at the respective matrix converters so as to be inserted between the AC power supply and the common coupling points.

* * * * *